United States Patent [19]
Cascione

[11] 3,783,165
[45] Jan. 1, 1974

[54] SOLUBLE COFFEE ANTIFOAM AND SLUDGE SUSPENDING AGENTS

[75] Inventor: Alexander Cascione, Yonkers, N.Y.

[73] Assignee: General Foods Corporation, White Plains, N.Y.

[22] Filed: June 1, 1972

[21] Appl. No.: 258,715

[52] U.S. Cl. .......................... 426/329, 252/321
[51] Int. Cl. .................................. A23f 1/04
[58] Field of Search .............. 99/71, 65, 76, 77; 252/321

[56] References Cited
UNITED STATES PATENTS

| | | | |
|---|---|---|---|
| 3,436,227 | 4/1969 | Bergeron et al. | 99/71 |
| 3,595,669 | 7/1971 | Strobel | 99/71 |

OTHER PUBLICATIONS

National Academy of Sciences, Chemicals Used in Food Processing, 1965, P. 26.

Tsen et al., Bakers Digest Vol. 45, June 1971, pp. 38–42.

*Primary Examiner*—Tim R. Miles
*Assistant Examiner*—William L. Mentlik
*Attorney*—Daniel J. Donovan et al.

[57] ABSTRACT

Antifoam and sludge-suspending compositions comprising substituted lactylates are incorporated into instant coffee products.

10 Claims, No Drawings

SOLUBLE COFFEE ANTIFOAM AND SLUDGE SUSPENDING AGENTS

BACKGROUND OF THE INVENTION

This invention relates to compositions to be incorporated into an instant coffee product which have improved antifoam and sludge-suspending properties. More specifically, it relates to the preparation of the sodium salts of 2-lactylic acid esters of monocarboxylic acids, which when incorporated into anhydrous coffee extract, produce little or no coffee foam and minimal precipitation of coffee solids on the addition of hot water.

Instant coffee produced by modern spray drying methods consists of hollow spheres or aggregates thereof. The resulting product has a low bulk density, is free flowing and readily dissolves on the addition of water. Instant coffee produced in this manner gives rise to a persistent foam when the water is added. This is thought to be due to air which is trapped between the hollow spheres on the addition of water and is apparently stabilized by a natural constituent in the coffee which is proteinaceous in character.

In process, this foam is often due to the high hydrolysis solubles yields and low oil content.

Frequently related to the problem of foam in the instant coffee product is the cup ring, a surface tension phenomenon that causes insoluble substances to be drawn to the cup wall, often accompanied by an extraneous, filmy matter appearing on the surface of the liquid.

In process, coffee foam is generally accompanied by a precipitation of coffee solids in the processing tanks after percolation. A serious loss of said solids is also evident when freeze concentrating the extract prior to freeze drying. In this instance, coffee solids adhere to the walls of the centrifuge and tar accumulates on the ice. Consequently, this results in a lowering of coffee solids and subsequent loss of coffee flavor and aroma.

Numerous attempts have been made to solve the foam and sludge problem in instant coffee. The relatively few innovations as evidenced in prior art illustrate the difficulty in finding an additive which is capable not only of alleviating the problem of foam and precipitation of coffee solids, but one which does not objectionably affect the dry product of the reconstituted coffee liquid.

A recent attempt to solve these problems is evidenced in U.S. Pat. No. 3,436,227 issued Apr. 1, 1969, suggesting the use of hydrocarbon substituted polycarboxylic acids having acid moieties selected from the group consisting of dicarboxylic and tircarboxylic acids having from 3 to 6 carbon atoms, examples being malic stearate, lauryl malonic acid, tartaric monostearate, tartaric distearate and the like. While these substances do offer improvements over some prior art, problems may arise concerning their approval as additives, referring specifically to lauryl malonic acid, due to its derivation from malonic acid and therefore to its probable irritant properties.

U.S. Pat. No. 3,620,756 issued Nov. 16, 1971 discloses the use of cationic exchange resins to remove polyvalent metal cations in untreated coffee extract, thereby eliminating the formation of insoluble nondispersible foam and scum. While this is a more sophisticated method of attaching the aforementioned problem of coffee foam and sludge, it is equally as expensive to execute.

At present, the silicones are the major antifoaming agents used industrially. Specifically, the methyl silicones and emulsions of these, a principle example being dimethyl siloxane, are used. This class of silicones was chosen mainly for its technical as well as economic value; said silicones are chemically and biologically inert, low in surface tension, water repellent, generally incompatible with organic materials and relatively inexpensive to use.

SUMMARY OF INVENTION

It has been found that the sodium salts of 2-lactylic acid esters of monocarboxylic acids are effective in reducing foam in the instant coffee process in the preparation of the resulting coffee extract for freeze drying by freeze concentration and in lowering the amount of coffee precipitate in the cup, and after percolation. Specifically, the sodium salts of 2-lactylic esters of saturated fatty acids have been found to exhibit such antifoam and sludge-suspending properties.

The antifoaming properties of these lactylates, particularly of the saturated fatty acids, are indeed surprising because of their current use in whipping compositions.

In addition to the aforementioned properties, these substituted lactylates are chemically and biologically inert and are generally incompatible with organic materials. Consequently such additives do not objectionably affect the dry product or the reconstituted coffee liquid.

Finally, the compositions of this invention are fully food approved and offer the simplest and least expensive method of solving the foam and sludge problems which are distinct advantages over prior art hereinbefore cited.

Accordingly, it is the general purpose of this invention to provide an improved instant coffee product which, on the addition of hot water, gives little foam, a reduced amount of surface impurities, and a minimal amount if any, of coffee insolubles in process and product. To attain this, the present invention comprises the use of a sodium salt of 2-lactylic acid ester of a monocarboxylic acid to obtain a readily soluble antifoam and sludge suspending agent.

DESCRIPTION OF THE INVENTION

Generically, the compounds of this invention are represented by the formula:

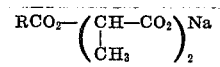

wherein R represents a straight chain alkyl of 5 to 21 carbons, preferably saturated and having 15 to 17 carbons.

Representative of the salts of the invention are Sodium stearoyl 2-lactylate, Sodium hexanoyl 2-lactylate, Sodium octanoyl 2-lactylate, Sodium decanoyl 2-lactylate, Sodium lauroyl 2-lactylate, Sodium myristoyl 2-lactylate, Sodium palmitoyl 2-lactylate, Sodium arachidoyl 2-lactylate, Sodium behenoyl 2-lactylate and the like, the preferred embodiment being Sodium stearoyl 2-lactylate, known commercially as "Emplex."

Sodium stearoyl 2-lactylate, the sodium salt of 2-lactylic acid ester of stearic acid, is a surface active agent. As it has the ability to suspend proteins, it inhibits the precipitation of the proteinaceous coffee solids. The exact mechanism of this linkage is not known but whatever the structural modification(s) taking place after the union of Sodium stearoyl 2-lactylate with the proteinaceous material, it does not affect either the hydrophobic or hydrophilic centers of the Sodium stearoyl 2-lactylate molecule which are necessary for the maintenance of its surfactant properties.

Accordingly, the hydrophobic centers of the salts of this invention, present in the oil phase of the coffee extract, may have an alkyl chain as short as 5 carbons or as long as 21 carbons, the preferred range being between 16 and 18 carbons as hereinbefore mentioned.

The hydrophilic portions of the salts of this invention may undergo variation with respect to the metals of said salts, sodium and potassium being the preferred variations. However, in order that the affinity for water be maintained, the carboxyl group of the hydrophilic centers of these compounds must remain unsubstituted.

The advantages of using Sodium stearoyl 2-lactylate or other such lactylates of monocarboxylic acids are numerous. In addition to it being fully approved for use in foods and beverages, Sodium stearoyl 2-lactylate is readily available commercially and is less expensive than silicone which up to now, has been the least expensive and most effective anti-foaming agent available.

The ability of these substituted lactylates of monocarboxylic acids to be added directly to the coffee extract without need of specialized equipment is an added feature over some prior art referring specifically to U.S. Pat. No. 3,620,756 which requires the use of a resin-exchange column through which the untreated coffee extract must pass in order to come in contact with the cationic exchange resin itself.

Because Sodium stearoyl 2-lactylate is temperature stable up to 302° F, said agent may be added at any time during instant coffee process except at the percolation stage itself which reaches temperatures of approximately 370° F.

In addition to their use during the preparation of the coffee extract the substituted lactylates are also beneficial in preventing foaming during the freeze concentration of said extract prior to freeze drying. When the salt is added prior to cnetrifuging the extract, the problem of tar accumulation on the ice and clogging due to accumulation of sediment is eliminated. Consequently, the foam which ordinarily was present on removal of the extract from freeze concentration is eliminated, and the coffee solids are retained within the extract resulting in a freeze dried instant coffee with improved flavor and aroma.

The processes of this invention are further illustrated but not limited by the following examples.

EXAMPLE I

A 0.4 percent solution of Sodium stearoyl 2-lactylate was prepared, 10 ml of which was mixed with 40 ml of a 32 percent coffee extract. This was shaken vigorously in a 200 ml flask.

A control was set up in the exact manner whereby 10 ml of water was mixed with the coffee extract rather than 10 ml of the agent to be tested.

Immediately after an identical period of agitation, a comparison was made between the foam in the control and test system.

The measurements indicated that there was approximately six times as much foam in the control as in the test sample containing Sodium stearoyl 2-lactylate.

Both were allowed to stand for a period of four hours. The amount of solids precipitating out after said period was considerable in the control (0.03 gms) but the amount of precipitate in the test system was negligible.

EXAMPLE II

Three test systems were prepared as follows:
1. Test Sample A containing 2 gms coffee
2. Test Sample B containing 2 gms coffee plus 0.10 percent Sodium stearoyl 2-lactylate
3. Test Sample C containing 2 gms coffee plus 0.25 percent Sodium stearoyl 2-lactylate One cup (236.5ml) of fresh boiling water (209° F ± 3° F) was poured from a height of 5 inches into the center of each of the three cups while maintaining the same rate of pouring in each cup. The foam was evaluated 10 seconds after pouring and after stirring 4 seconds (6 strokes) using the following evaluation table.

| 10 Seconds after pouring | After stirring |
|---|---|
| 0. No foam | |
| 1. Broken ring or scattered foam | 1. No foam |
| 2. Light continuous ring | 2. Broken ring |
| 3. Continuous ring | 3. Light ring |
| 4. Moderate ring (approx. ¼″) | 4. Light ring |
| 5. Heavy ring | 5. Light ring |
| 6. Heavy ring and light center | 6. Moderate ring |
| 7. Heavy ring and center | 7. Moderate ring |
| 8. Over 25% of the area | 8. Heavy ring |
| 9. Over 90% of the area | |
| 10. 100% of the area | |

The results were:

TABLE I

| Concentration of Sodium stearoyl 2-lactylate | Foam and scum grades 10 sec. after pouring | Foam and scum grades after stirring for 4 seconds (6 strokes) |
|---|---|---|
| A. 0 (control) | 9 | 8 |
| B. 0.10% | 5 | 5 |
| C. 0.25% | 3 | 3 |

What is claimed is:

1. The method of reducing coffee foam and sludge comprising incorporating into instant coffee an effective amount of a sodium salt of 2-lactylic acid esters of a monocarboxylic acid.

2. The method of claim 1 wherein the salt is selected from the formula

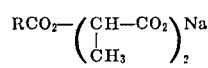

wherein R represents an alkyl radical of 5 to 21 carbons.

3. The method of claim 2 wherein R is alkyl derived from a saturated fatty acid.

4. The method of claim 3 in which the alkyl radical contains 15 to 17 carbons.

5. The method of claim 3 wherein the saturated acid is stearic acid.

6. The method of claim 5 wherein the salt is Sodium stearoyl 2-lactylate.

7. The method of claim 1 which comprises adding the salts to an aqueous coffee extract and drying said extract.

8. The method of claim 7 in which the coffee extract is spray dried.

9. The method of claim 7 in which the coffee extract is concentrated prior to drying.

10. The method of claim 9 wherein the coffee extract is freeze concentrated and freeze dried.

* * * * *

UNITED STATES PATENT OFFICE
CERTIFICATE OF CORRECTION

Patent No. 3,783165  Dated January 1, 1974

Inventor(s) Alexander Cascione

It is certified that error appears in the above-identified patent and that said Letters Patent are hereby corrected as shown below:

In Column 1, Line 67 after "of" and before "the" the word ...attaching... should read ...attacking...

In Column 3, Line 49 after "to" and before "the" the word ...cnetrifuging... should read ...centrifuging...

Signed and sealed this 6th day of August 1974.

(SEAL)
Attest:

McCOY M. GIBSON, JR.  C. MARSHALL DANN
Attesting Officer  Commissioner of Patents